US012565111B1

(12) United States Patent
Montllo Casabayo et al.

(10) Patent No.: US 12,565,111 B1
(45) Date of Patent: Mar. 3, 2026

(54) BIDIRECTIONAL SPLIT-PHASE POWER CONVERTER FOR ELECTRIC VEHICLE CHARGING

(71) Applicant: dcbel Inc., Montréal (CA)

(72) Inventors: Ernest Montllo Casabayo, Montréal (CA); Paulo Barroso, Brossard (CA); Reza Hesaraki, Montréal (CA)

( * ) Notice: Subject to any disclaimer, the term of this patent is extended or adjusted under 35 U.S.C. 154(b) by 0 days.

(21) Appl. No.: 19/324,953

(22) Filed: Sep. 10, 2025

Related U.S. Application Data

(60) Provisional application No. 63/767,062, filed on Mar. 5, 2025.

(51) Int. Cl.
| | |
|---|---|
| *B60L 53/22* | (2019.01) |
| *B60L 53/51* | (2019.01) |
| *B60L 53/62* | (2019.01) |
| *B60L 55/00* | (2019.01) |
| *H02J 3/32* | (2006.01) |
| *H02S 20/30* | (2014.01) |

(52) U.S. Cl.
CPC .............. *B60L 53/22* (2019.02); *B60L 53/51* (2019.02); *B60L 53/62* (2019.02); *B60L 55/00* (2019.02); *H02J 3/322* (2020.01); *H02S 20/30* (2014.12); *B60L 2210/10* (2013.01); *B60L 2210/30* (2013.01); *B60L 2210/40* (2013.01)

(58) Field of Classification Search
CPC .......... B60L 53/22; B60L 55/00; B60L 53/51; B60L 53/62; B60L 2210/10; B60L 2210/30; B60L 2210/40; H02S 20/30; H02J 3/32; H02J 3/322
See application file for complete search history.

(56) References Cited

U.S. PATENT DOCUMENTS

| | | | |
|---|---|---|---|
| 6,281,636 | B1 | 8/2001 | Okutsu et al. |
| 9,009,956 | B2 | 4/2015 | Xue et al. |
| 9,543,855 | B2 | 1/2017 | Soeiro et al. |
| 9,800,176 | B2 | 10/2017 | Ding et al. |
| 10,658,920 | B2 | 5/2020 | He et al. |
| 10,778,114 | B2 | 9/2020 | Lu et al. |
| 11,705,829 | B2 | 7/2023 | Zmood et al. |
| 2009/0003024 | A1 | 1/2009 | Knaup |
| 2017/0317607 | A1 | 11/2017 | Agirman et al. |
| 2023/0421074 | A1 | 12/2023 | Yu et al. |

FOREIGN PATENT DOCUMENTS

| | | |
|---|---|---|
| EP | 2728734 A1 | 5/2014 |
| EP | 3193441 A1 | 7/2017 |
| EP | 3301804 B1 | 10/2021 |
| JP | 2015035902 A | 2/2015 |

*Primary Examiner* — Robert L Deberadinis
(74) *Attorney, Agent, or Firm* — Anglehart et al.

(57) ABSTRACT

A bidirectional battery charger capable of receiving single-phase AC power and delivering DC power to an electric power storage battery is adapted to operate with high-frequency isolation transformed on the DC side.

18 Claims, 12 Drawing Sheets

205

BIDIRECTIONAL SPLIT-PHASE POWER CONVERTER FOR ELECTRIC VEHICLE CHARGING

CROSS-REFERENCE TO RELATED APPLICATIONS

This application claims priority from U.S. Provisional Patent Application 63/767,062 filed Mar. 5, 2025, the contents of which are hereby incorporated by reference.

TECHNICAL FIELD

The present disclosure relates generally to the field of electrical power converters and more specifically to converters providing galvanic isolation.

BACKGROUND

This section intends to provide a background or context to the invention recited in the claims. The description herein may include concepts that could be pursued but are not necessarily ones that have been previously conceived or pursued. Therefore, unless otherwise indicated herein, what is described in this section is not prior art to the description and claims in this application and is not admitted as being prior art by inclusion in this section.

DC chargers for electric vehicles (EVs) typically use an isolation transformer to receive grid power and provide electrical power that is not referenced to ground. While this makes the charging power safe against a ground fault, such EV chargers are larger and more expensive than non-isolated solutions.

In the case of a bidirectional EV charger for home use, an advantage of using an isolation transformer is that, in the case of split-phase AC grids, a single-phase AC-to-DC power converter can provide AC power from the EV to the home on either or both of the split-phase lines which is necessary when providing power during a blackout situation (Vehicle to Home or V2H) such that no grid transformer can provide the balancing. There is currently no suitable bidirectional EV charger that avoids an isolation transformer and is suitable for use with split-phase home power grids.

SUMMARY

The Applicant has found an apparatus for providing bidirectional isolated power conversion for different types of current in the context of split-phase that has high efficiency and can be implemented using a small transformer.

In a broad aspect of current invention, a bidirectional power converter for converting electric power between an AC power grid and an electric vehicle (EV) may comprise: two AC-to-DC power converters, each one of the two AC-to-DC power converters may have a first AC port connectable to a respective phase of the AC power grid and a second AC port connected together at a midpoint or neutral; at least one isolated DC-to-DC power converter, which may be connected to a DC side of the two AC-to-DC power converters and to EV power terminals; and a power conversion controller, which may have an interface for receiving a charge voltage and current command from a battery management system (BMS) of an electric power storage battery of an EV, a grid tie phase and a voltage measurement. The isolated DC-to-DC power converter may further comprise: an isolation transformer; a first DC to high-frequency AC converter, which may be connected to the DC side of the two AC-to-DC power converters and to a primary winding of the isolation transformer on the AC side; and a second high-frequency AC to DC converter, which may be connected to a secondary winding of the isolation transformer on the AC side and to EV power terminals on the DC side. Furthermore, the power conversion controller may be operatively connected to said two AC-to-DC power converters and to at least one isolated DC-to-DC power converter for transferring power in accordance with said charge voltage command and said grid tie phase and voltage measurement.

BRIEF DESCRIPTION OF THE DRAWINGS

The present examples will be better understood with reference to the appended illustrations, which are as follows:

FIG. 6 also schematically illustrates the DC link and bus capacitors;

DETAILED DESCRIPTION

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

Reference throughout this application to "one embodiment", "an embodiment", or similar language means that a particular feature, structure, or characteristic described in connection with the embodiment is included in at least one embodiment of the present invention. Thus, appearances of the phrases "in one embodiment", "in an embodiment", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the scope of the invention. Thus, it is intended that the present description covers the modifications and variations of the present invention and may then come within a scope of the appended claims and their equivalents. Reference will now be made in detail to the preferred embodiments of the invention.

Figure 1:
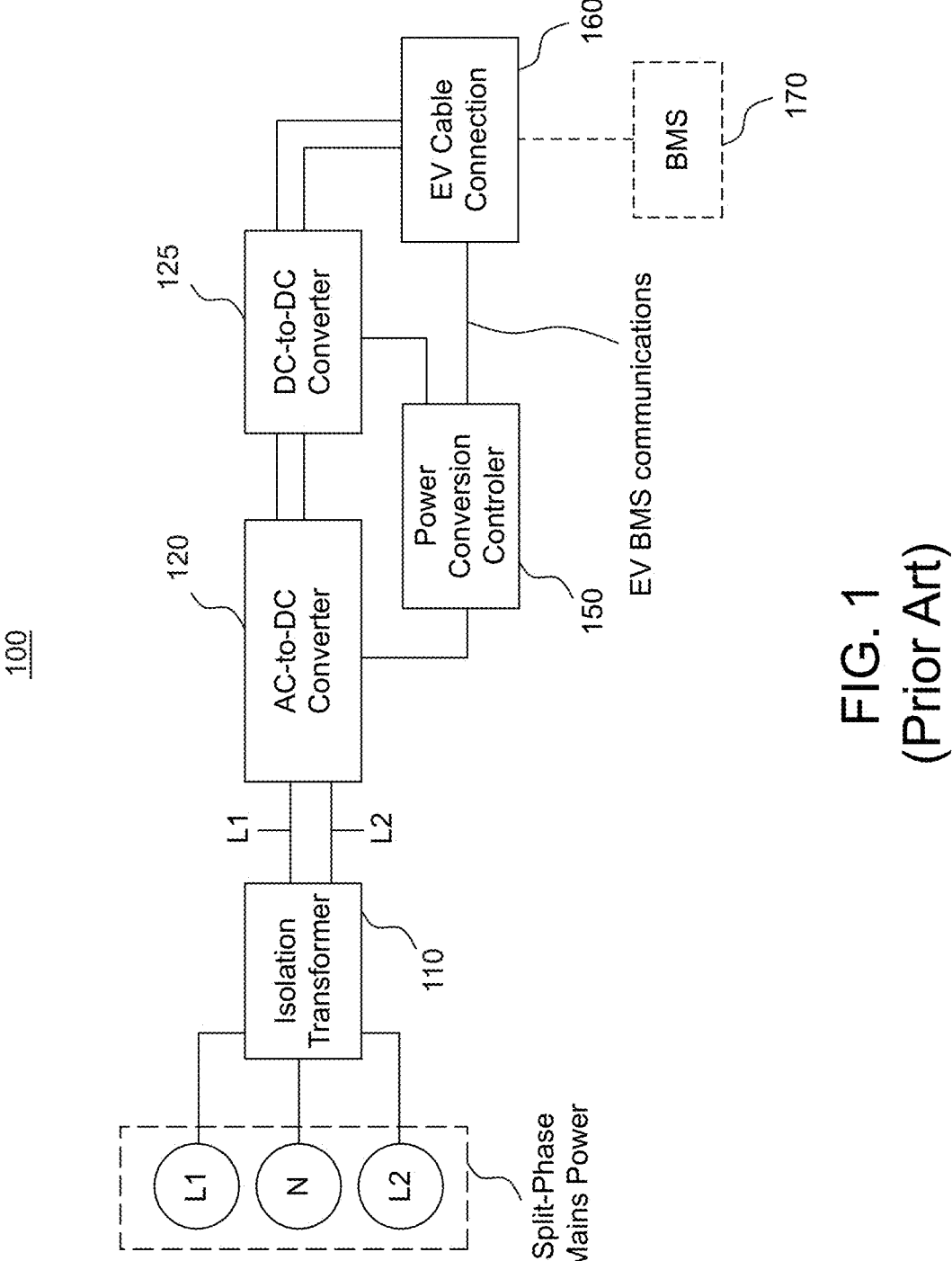
FIG. 1 is a schematic block diagram of an isolated EV charger, which is known in the art and uses an isolation transformer between the grid and the power converter.

FIG. 1 schematically illustrates a bidirectional power converter 100 of a bidirectional EV charger known in the prior art comprising a split-phase AC input from the split-phase mains power, including three terminals, namely, terminals L1 and L2 for two live ("hot") wires each carrying 120 V, with their associated AC signals being 180 degrees out of space, as well as the neutral terminal N. When EV charger operates in the rectifier mode, the AC input provided by split-phase mains may be connected to an isolation transformer 110 that guarantees galvanic isolation and, as a result, protects a user from an electric shock. Isolation transformer 110 may be further connected to an AC-to-DC power converter 120, wherein the output of the latter may further be supplied to a DC-to-DC converter 125. The output of DC-to-DC converter 125 may then be supplied to a battery of an electric vehicle (EV) through an EV cable connection 160. Both, AC-to-DC converter 120 and DC-to-DC converter 125 may be operated using a power conversion controller 150. It may be appreciated by the person skilled in the art that the battery management system (BMS) 170 may communicate with power conversion controller 150 via EV cable connection 160 in order to transmit the information about current charge level and a desired charge voltage for charging the EV battery, i.e., a power conversion controller may have an interface for receiving a charge voltage command from BMS 170, including a desired charge voltage value of an EV, a grid tie phase, and a voltage measurement providing an amount of available voltage that could be supplied to the battery of an EV. It may be appreciated that if a power conversion controller 150 is located on the board of an EV, the EV cable connection 160 may be internal to an EV.

Figure 2A:
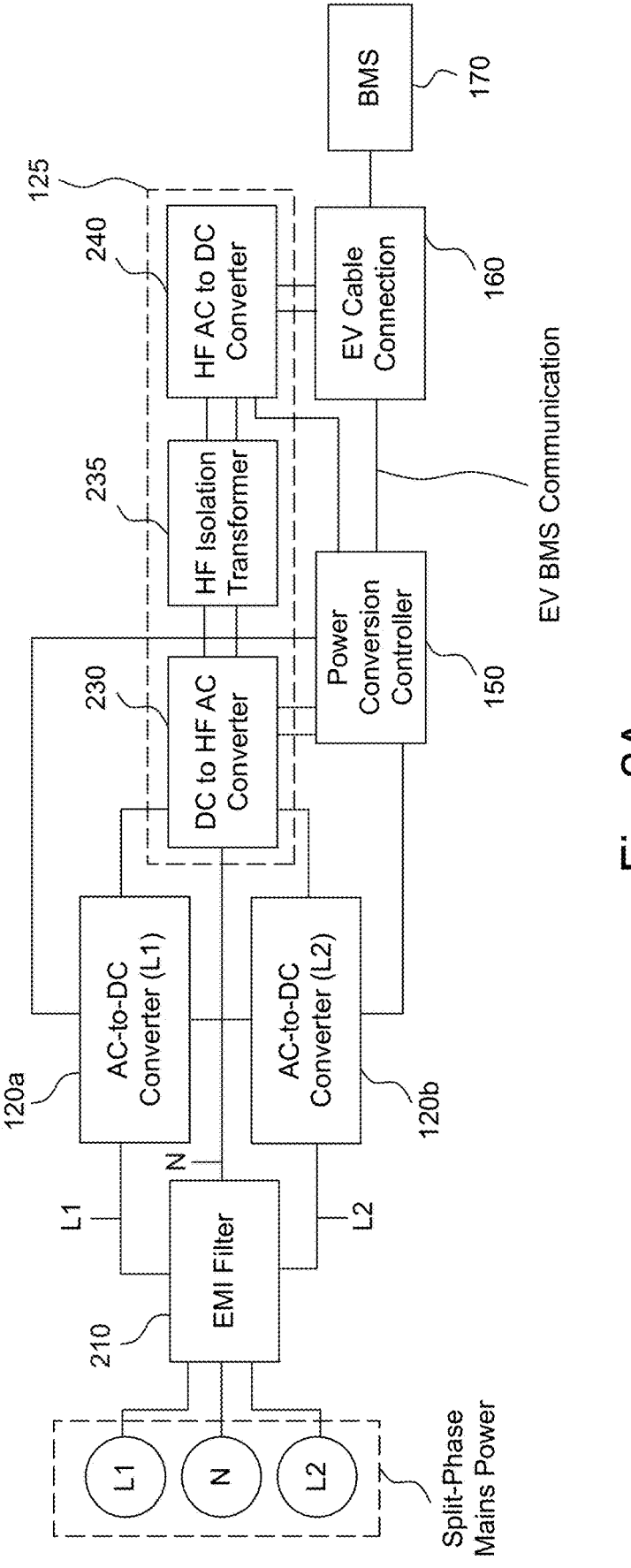
FIG. 2A is a schematic block diagram of an isolated EV charger having an EMI filter connected to split-phase mains power and an isolated DC-to-DC power converter in accordance with an embodiment of the present invention.

FIG. 2A schematically illustrates a simplified block diagram 200a depicting a bidirectional power converter provided in the context of this embodiment, in which an EV may be charged DC charged using an off-board charger connected directly to split-phase AC mains power, without the use of isolation transformer 110 coupled to AC mains as illustrated in FIG. 1. In this example, an EV charger may operate in the rectifier mode, and, therefore, AC power supplied from terminals L1 and L2 may first be passed through an EMI filter 210. It may be appreciated that EMI filter 210 may be provided by a dual-stage EMI filter, which may help to minimize radiated and conducted noise, mitigate voltage transients from the input of the AC mains, and therefore offer a higher level of noise attenuation. The output of EMI filter 210 associated with L1 and L2 may then be provided to AC-to-DC converters 120a and 120b, respectively. Furthermore, the output of AC-to-DC converters 120a and 120b may then be supplied to at least one isolated DC-to-DC power converter 125, which may comprise a first DC to high-frequency AC converter 230, an isolation transformer 235, which may be provided by a high-frequency isolation transformer, and a second high-frequency AC to DC converter 240. When bidirectional power converter 200a operates in the rectifier mode, power conversion controller 150 may receive a charge voltage command from BMS 170 through EV cable connection 160 and may respond to that command by producing a suitable DC voltage output. However, it may be appreciated that when bidirectional power converter 200a operates in the inverter mode, it may produce an AC current respecting desired grid tie phase and output AC current to a respective phase of AC power grid. It may also be appreciated that when bidirectional power converter 200a operates in an inverter mode, a second power conversion controller 150 may be required.

Figure 2B:
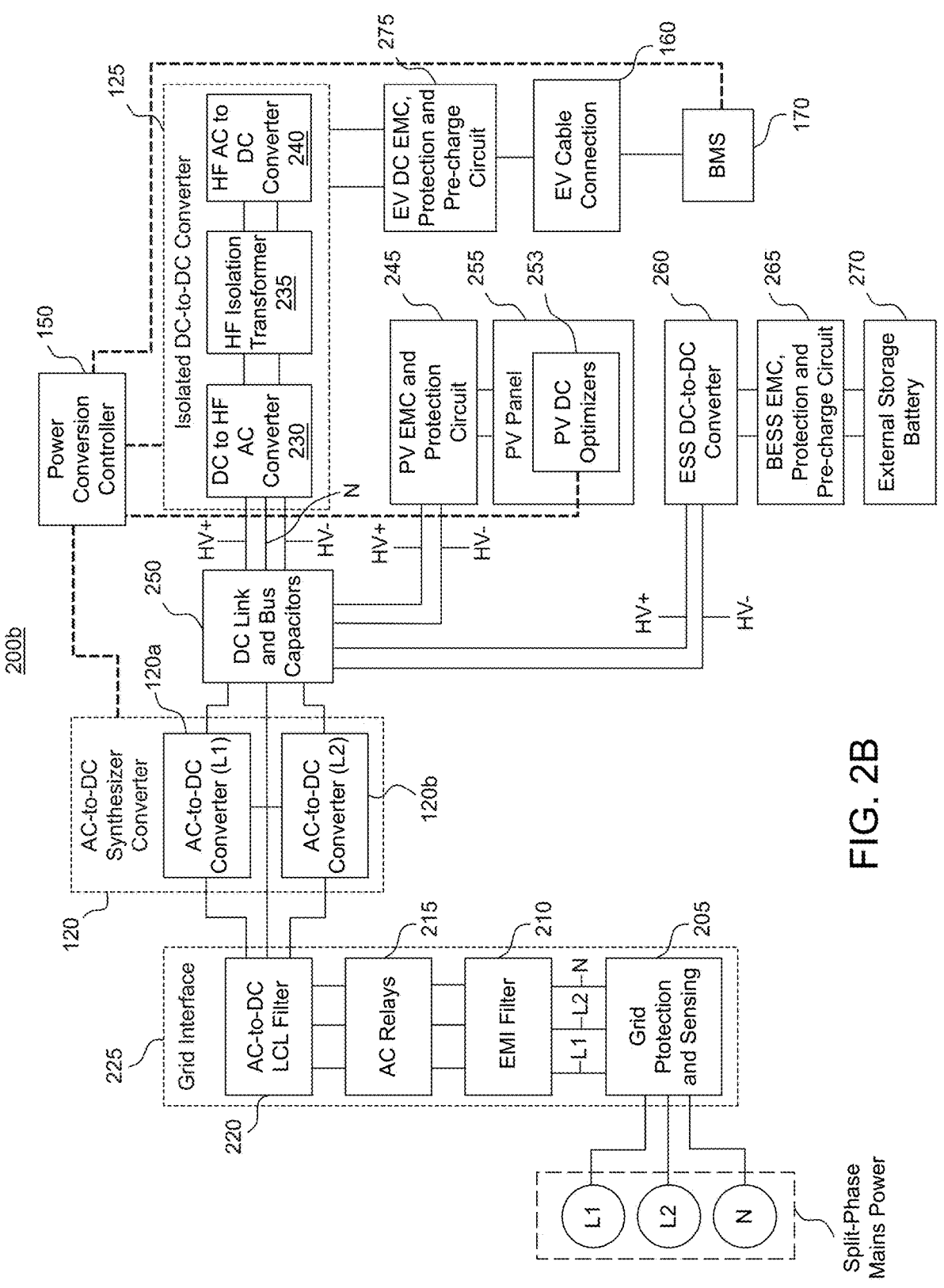
FIG. 2B is a schematic block diagram providing a detailed view of an isolated EV charger illustrated in FIG. 2A having a high-frequency isolation transformer in the DC-to-DC power conversion stage in accordance with an embodiment of the present invention.

FIG. 2B schematically illustrates a detailed block diagram 200b of bidirectional power converter 200a illustrated in FIG. 2A provided in the context of this embodiment. It may be appreciated that, when bidirectional power converter 200b operates in the rectifier mode, before reaching EMI filter 210, the AC power from split-phase mains power supply, i.e., from L1 and L2 terminals, may first pass through grid protection and sensing stage 205. When charging an EV battery or supplying AC power back to the grid, the AC relays 215 may be closed, allowing the AC power to flow through the AC-to-DC LCL filter 220, and then be supplied to AC-to-DC synthesizer converter 120, which may comprise AC-to-DC power converters 120a and 120b. It may be appreciated that grid protection and sensing stage 205, EMI filter 210, AC relays 215, and AC-to-DC LCL filter 220 may constitute a part of grid interface 225. It may be appreciated that, for the purpose of illustration, the communication between power conversion controller 150, BMS 170, AC-to-DC Synthesizer Converter 120, isolated DC-to-DC converter 125 and PV DC optimizers 253 is provided by dashed connectors.

As further illustrated in FIG. 2B, when bidirectional power converter 200b operates in the rectifier mode, the output of the AC-to-DC converters 120a and 120b may further be used to charge DC link and bus capacitors 250, which may be connected to at least one isolated DC-to-DC-converter 125. It may be appreciated that, in this example, DC-to-DC-converter 125 be provided by, but is not limited to, a 3-level dual active bridge (DAB) converter.

It may be appreciated that a photovoltaic (PV) system may comprise a PV panel array 255, each of which may include PV DC power optimizers 253 allowing for power conversion control of each individual panel or groups of panels within the array.

It may further be appreciated that PV panel array 255, or at least one storage battery 270, or both, may be connected to DC link and bus capacitors 250. It may also be appreciated that a PV electromagnetic compatibility (EMC), protection and pre-charge circuit 245 may be connected DC link and bus capacitors 250 and the output of at least one PV panel 255. Furthermore, a battery energy storage system (BESS) EMC, protection and pre-charge circuit 265 may be connected to the positive and negative DC terminals of storage battery 270. Moreover, a third energy storage system (ESS) DC-to-DC converter 260 may be connected between DC link and bus capacitors 250 and BESS EMC, protection and pre-charge circuit 265, in order to, for example, charge DC link and bus capacitors 250 to a desired voltage level. It may be appreciated that an EV is connected to bidirectional power converter 200b, DC power from at least one PV panel, for example, may be supplied to storage battery 270 or split-phase mains power.

It may be appreciated by the person skilled in the art that EV DC EMC, protection and pre-charge circuit 275 may be connected to second high-frequency AC to DC converter of isolated DC-to-DC converter 125 on the DC side, for ensuring safe operation during the EV connection process and preventing large inrush current which may damage the EV battery, when an EV charger operates in rectifier mode.

A detailed description of the components of power converter 200b will now be provided.

Figure 3:
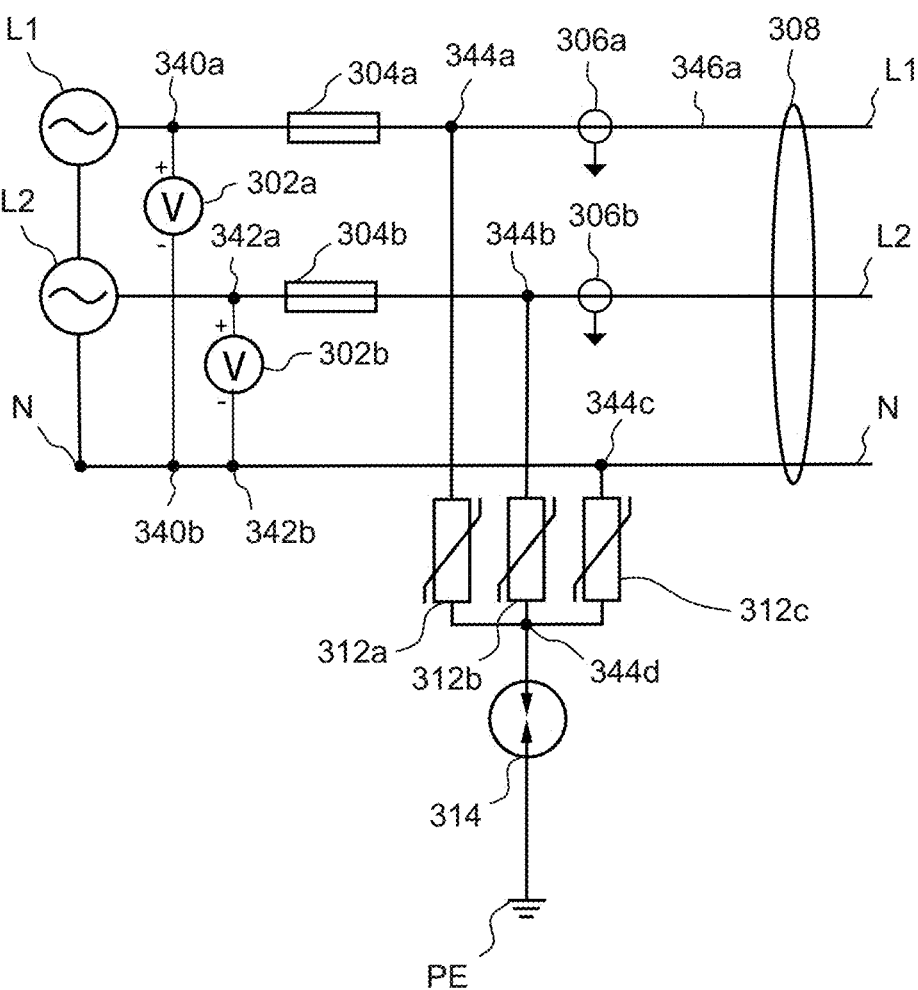
FIG. 3 is a schematic illustration of the grid protection components provided in FIG. 2B.

FIG. 3 schematically illustrates a circuit diagram of grid interface 225 of the power converter 200b illustrated in FIG. 2B further connected to grid protection components. Each terminal L1 and L2 may be connected in series with a fuse 304a and 304b, respectively. Placing a fuse in series with each terminal of the AC power source may provide over-current protection for power converter 200b, which may help protect power converter 200b from catching fire. Also, fuses 304a and 304b may help to protect the power source, i.e., split-phase AC power mains, and the conductors feeding into the power supply, when bidirectional power converter 200b operates in an inverter mode. For reasons of protection, there may not be any other circuit components between the fuse and the conductors from the AC power source, so when fuses 304a and 304b open, this may stop the current flow through a corresponding circuit branch of power converter 200b. It may be appreciated by the person skilled in the art that fuses 304a and 304b may be selected based upon the voltage, current, response time and operating temperature of the other circuit components of power converter 200b.

As further schematically illustrated in FIG. 3, metal oxide varistors (MOVs) 312a, 312b, 312c may be placed across the AC input terminals L1, L2, and neutral N, respectively, i.e., between terminals 344a and 344d, 344b and 344d, 344c and 344d, allowing to absorb voltage transients which may be provided by the split-phase AC mains power source, such as, for example, transient energy from lightning strikes, or other damage from the AC power network. MOVs 312a, 312b, and 312c may be high impedance during their normal operation and become low impedance when the rated voltage is exceeded, as would happen when an input transient voltage is present. It may be appreciated by a person skilled in the art that each MOV 312a, 312b may be connected in series with a fuse 304a, 304b, respectively, which may allow a fuse to open if a corresponding MOV goes low impedance due to a transient input voltage. It may be appreciated that MOVs may be selected based on the operating voltage of the power supply. It may also be appreciated that alternative protection components to a MOV may be, for example, transient voltage suppression (TVS) or a diode.

Furthermore, in this embodiment, a gas discharge tube (GDT) 314 may be connected in series with MOVs 312a, 312b, and 312c, i.e., between terminals 344d and 346b, which may also be used as additional surge protection.

Moreover, current sensors 306a and 306b may be used for monitoring the ripple in the electrical current flowing through live wires L1 and L2, respectively, ensuring power quality (PQ) control. Furthermore, a ground fault detection (GFD) device 308, which may be connected to live wires L1, L2 and neutral wire N, may be used to determine if there exists a fault condition if the current imbalance may appear in live wires L1 and L2.

Figure 4:
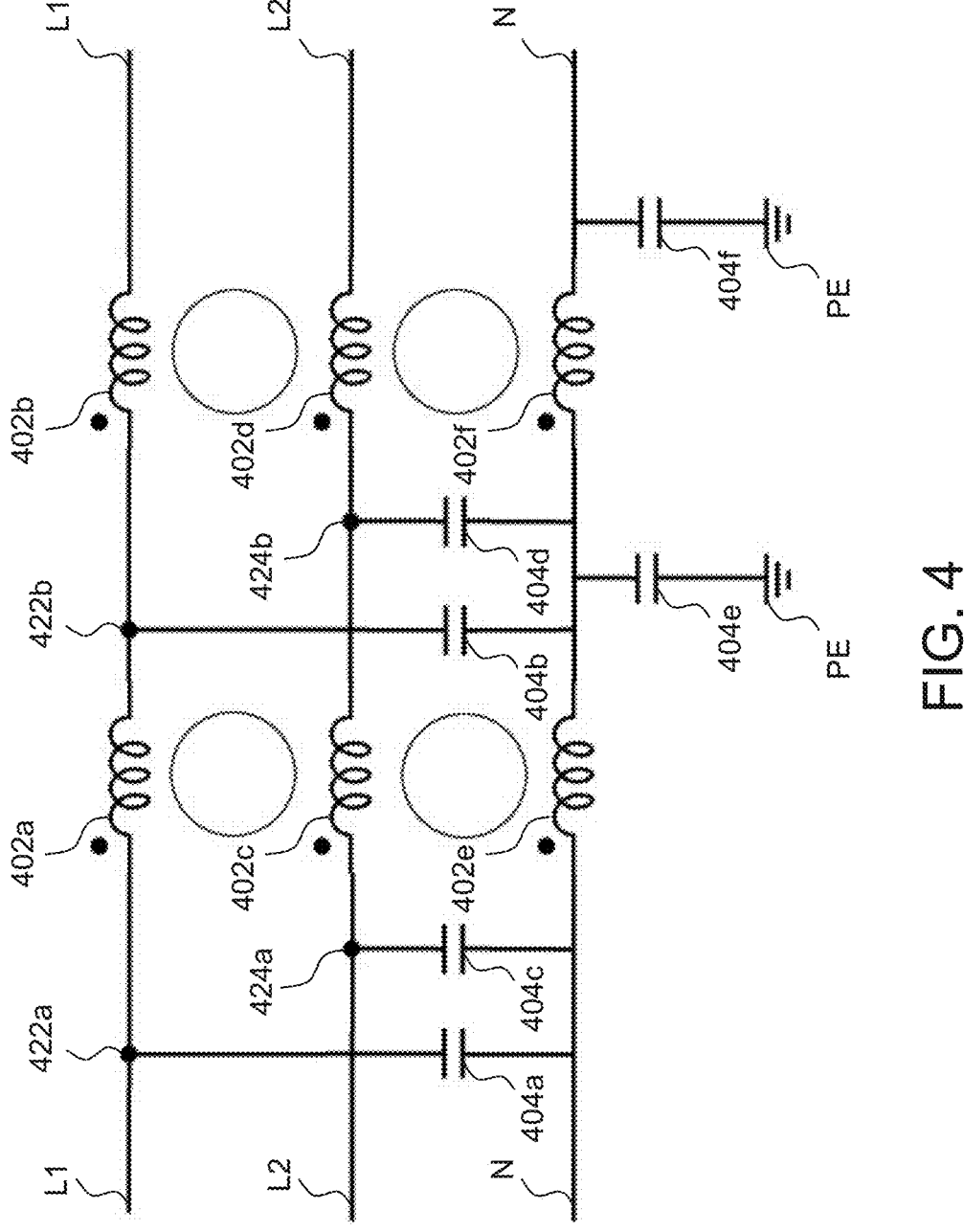
FIG. 4 is a schematic illustration of the dual-stage EMI filter.

FIG. 4 schematically illustrates an electrical circuit diagram of EMI filter 210, which may comprise two inductors 402a, 402b placed in series with the live wire L1, two inductors 402c, 402d placed in series with the live wire L2, and two inductors 402e, 402f placed in series with the neutral wire N. Furthermore, inductors 402a, 402c, and 402e, as well as inductors 402b, 402d, and 402f, may be magnetically coupled, i.e., wound on the same magnetic core, which may be made of ferromagnetic material, such as, for example, iron or ferrite, providing a common mode choke, allowing them to filter out high-frequency noise, which may be present on live wires L1 and L2, while allowing the desired AC signal to pass through. It may be appreciated by a person skilled in the art that any other suitable EMI filter may be used in place of the EMI filter 210.

As further schematically illustrated in FIG. 4, EMI filter 210 may also comprise two capacitors 404a and 404b, each of which may be connected between the live wire L1 and the neutral N (i.e., between terminal 422a and N, and between terminal 422b and N, respectively), and two capacitors 404c and 404d, each of which may be connected between the live wire L2 and the neutral N (i.e., between terminal 424a and N, and between terminal 424b and N, respectively). It may be appreciated that capacitors 404a, 404b, 404c, and 404d may be connected in parallel and may filter the differential-mode noise, i.e., the noise which may be present between two conductors, such as, in this case, the live and neutral AC lines. Furthermore, two capacitors 404e and 404f may be connected between a neutral wire N and the ground (PE). It may be appreciated that capacitors 404e and 404f may be connected in parallel and may filter the common mode noise.

Figure 5:
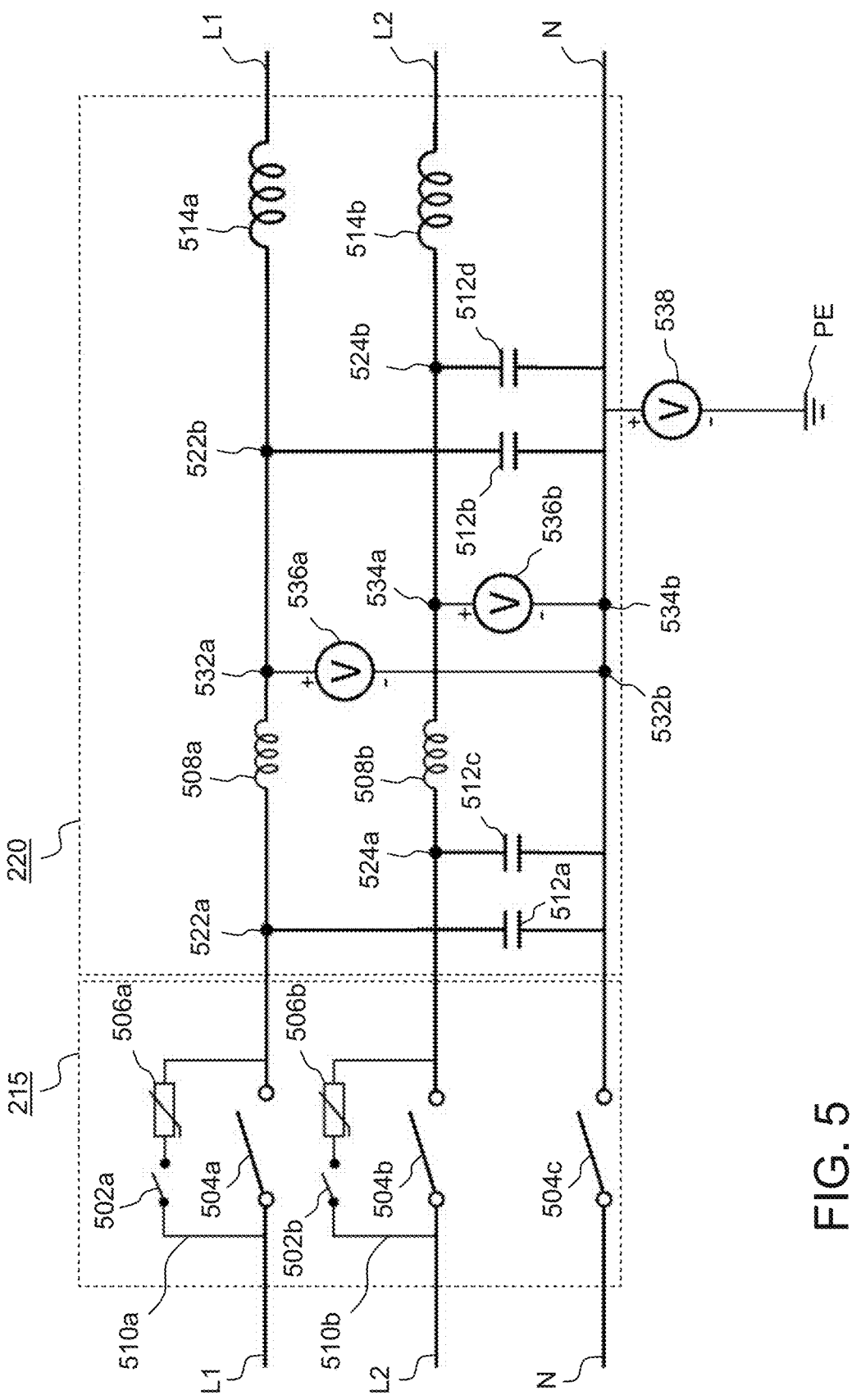
FIG. 5 is a schematic illustration of a part of the AC-to-DC converter comprising AC relays and the AC-to-DC LCL filter.

As further schematically illustrated in FIG. 5, EMI filter 210 may be further connected to AC relays 215. AC relay 510a/510b associated with each live wire L1, L2, respectively, may comprise a pre-charge contactor 502a, 502b, which may be connected in series with a thermistor 506a, 506b, respectively. Furthermore, AC relay 510a/510b may comprise a main contactor 504a/504b, which may be placed on the live wire L1/L2 and may be connected in parallel to pre-charge contactor 502a/502b and thermistor 506a/506b, respectively. Furthermore, a main contactor 504c may be placed on a neutral wire N. It may be appreciated by the person skilled in the art that, when EV charger operates in the rectifier mode, closing the pre-charge contactors 502a/502b of the AC relays 510a/510b, respectively, would allow to the current flow through the resistors 506a/506b, which, in turn, may reduce the inrush of current to the capacitors of the further connected AC-to-DC LCL filter 250, allowing them to charge slowly, avoiding inrush current spikes.

As further illustrated in FIG. 5, a circuit diagram 550 of AC-to-DC LCL filter 220 may comprise capacitors 512a and 512b, which may be connected between the live wire L1 and neutral N, i.e., between the terminal 522a and N, as well as between the terminal 522b and N, respectively. AC-to-DC LCL filter 220 may also comprise capacitors 512c and 512d, which may be connected between the live wire L2 and neutral N, i.e., between terminal 524a and N, as well as between terminal 524b and N, respectively. The circuit of AC-to-DC LCL filter 220 may further comprise inductors 508a and 514a, which may be placed in series with live wire L1, i.e., both inductors 508*a* and 514*a* may be connected to terminal 522*b*, and inductors 508*b* and 514*b*, which may be placed in series with live wire L2, i.e., both inductors 508*b* and 514*b* may be connected to terminal 524*b*. It may be appreciated that inductors 514*a* and 514*b* may have a greater inductance than inductors 508*a* and 508*b*. Therefore, inductor 508*a*, capacitor 512*b*, and inductor 514*a*, as well as inductor 508*b*, capacitor 512*d*, and inductor 514*b*, may form LCL filters of the AC-to-DC LCL filter 520, allowing for attenuation of high-frequency harmonics in the AC traveling through live wires L1 and L2, respectively. For example, when a power converter 200*b* operates as an inverter, the AC-to-DC LCL filter 250 would prevent the noise from propagating into a user's home or back into AC mains. It may be appreciated by a person skilled in the art that any other suitable AC-to-DC LCL filter may be used instead or in combination with AC-to-DC LCL filter 220.

Moreover, a voltmeter 536*a* may be connected between terminals 532*a* and 532*b*, and a voltmeter 536*b* may be connected between terminals 534*a* and 534*b*, allowing for the measurement of the potential difference between the live wire L1 and neutral wire N, as well as the live wire L2 and N, respectively. Furthermore, a voltmeter 538 may be connected between the neutral wire N and the ground (PE), in order to ensure the safety of the electrical system.

Figure 6:
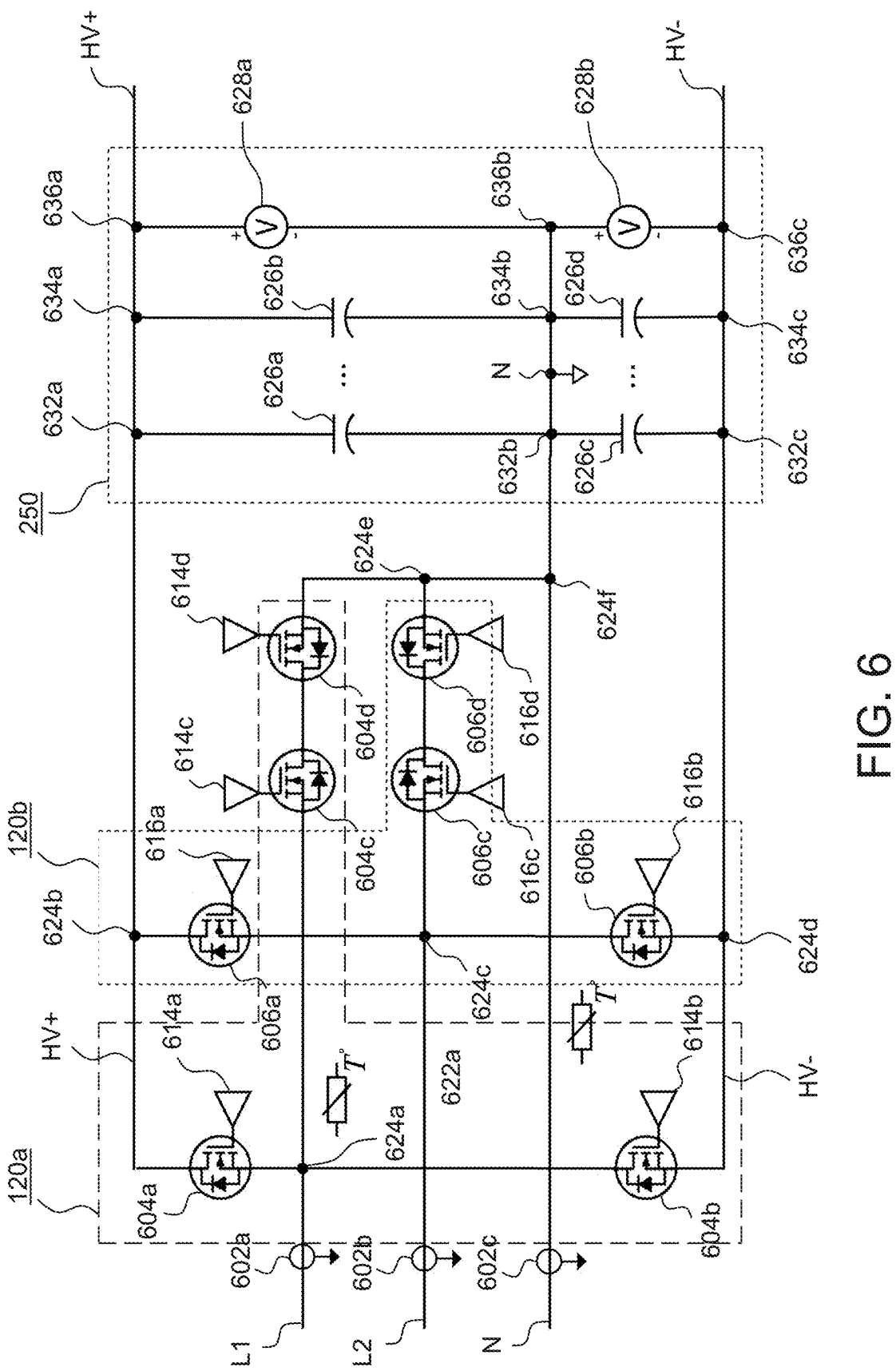
FIG. 6 schematically illustrates the AC-to-DC synthesizer converter, which may comprise two AC-to-DC power converters.

As further schematically illustrated in FIG. 6, the AC-to-DC LCL filter 220 may further be connected to the AC-to-DC converters 120*a* and 120*b*, which may have the T-type topology and may be used to convert the AC voltage into multi-level DC voltage or vice versa. In this embodiment, AC-to-DC converters 120*a* and 120*b* may have three-level T-type topology. It may be appreciated that switch 604*a* may be connected to the live wire L1 and positive high-voltage line HV+, i.e., between terminals 624*a* and 632*a*, switch 604*b* may be connected to the live wire L1 and negative high-voltage line HV−, i.e., between terminals 624*a* and 634*c*, and switches 604*c* and 604*d* may be placed in series with the live wire L1 and may further be connected to neutral N, i.e., between terminals 604*c* and 604*d*. Switches 604*a*, 604*b*, 604*c* and 604*d* may form a first single-bridge leg of AC-to-DC converter 120*a* associated, for example, with the live wire L1.

It may further be appreciated that switch 606*a* may be connected between the live wire L2 and positive high-voltage line HV+, i.e., between terminals 624*c* and 632*a*, switch 606*b* may be connected between the live wire L2 and negative high-voltage line HV−, i.e., between terminals 624*c* and 632*c*. Furthermore, switches 606*c* and 606*b* may be placed in series with the live wire L2 and may further be connected to neutral N, i.e., between terminals 624*c* and 624*e*, and switches 606*c* and 606*d* may be placed in series with the live wire L2, i.e., may be connected in series between terminals 624*c* and 624*e* that may further be connected to neutral wire N through terminal 624*f*. It may be appreciated that switches 606*a*, 606*b*, 606*c* and 606*d* may form a second single-bridge leg of AC-to-DC converter 120*b* associated, for example, with the live wire L2.

It may be appreciated that switches 604*a*, 604*b*, 604*c* and 604*d* of AC-to-DC converter 120*a* and switches 606*a*, 606*b*, 606*c* and 606*d* of AC-to-DC converter 120*a* current may be controlled by power conversion controller 150, for allowing the current to flow naturally to the correct branch independently from the current direction. It may also be appreciated by the person skilled in the art that the positive voltage level, for example, may be achieved by closing switch 604*a*/604*b*, the neutral level may be achieved by closing switches 604*c*/606*c* and 604*d*/606*d*, and the negative voltage level may be achieved by closing switch 604*b*/606*b*, respectively. Moreover, the above-mentioned switches may be provided by IGBT, MOSFET, SiC, or any other suitable switches. As an example, IGBT switches are illustrated in FIG. 6. It may be appreciated that switches 604*a*, 604*b*, 604*c* and 604*d* may comprise gate inputs 614*a*, 614*b*, 614*c* and 614*d*, switches 606*a*, 606*b*, 606*c*, and 606*d* may comprise gate inputs 616*a*, 616*b*, 616*c*, and 616*d*, respectively, in order to control the conductivity of the switches.

It may further be appreciated by a person skilled in the art that current sensors 602*a*, 602*b*, and 602*c* may be placed on the live wires L1, L2 and neutral wire N, respectively, for monitoring the ripple in the electrical current.

As further schematically illustrated in FIG. 6, AC-to-DC converters 120*a* and 120*b* may be further connected to DC-link and DC-bus capacitors 250 through positive high-voltage DC terminal 624*b* and negative high-voltage DC terminal 624*b*, respectively, as well as neutral terminal 624*f*. A capacitor 626*a* may be connected in parallel with at least one capacitor 626*b*, wherein capacitor 626*a* may be connected between positive high-voltage line HV+ and neutral wire N, i.e., between terminals 632*a* and 632*b*, and capacitor 626*b* may be connected between positive high-voltage line HV+ and neutral wire N, i.e., between terminals 634*a* and 634*b*. Furthermore, a capacitor 626*c* may be connected in parallel with at least one capacitor 626*d*, wherein capacitor 626*c* may be connected between negative high-voltage line HV− and neutral wire N, i.e., between terminals 632*b* and 632*c*, and a capacitor 626*d* may be connected between negative high-voltage line HV− and neutral N, i.e., between terminals 634*b* and 634*c*. It may be appreciated that capacitors 626*a* and 626*c*, as well as at least one capacitor 626*b* and at least one capacitor 626*d*, may be connected in series.

Moreover, a voltmeter 628*a* may be connected between the positive high-voltage line HV+ and neutral wire N, i.e., between terminals 636*a* and 636*b*, and a voltmeter 628*b* may be connected between the negative high-voltage line HV− and neutral wire N, i.e., between terminals 636*b* and 636*c*, allowing to measure the potential difference between HV+ and N, and HV− and N, respectively.

Figure 7:
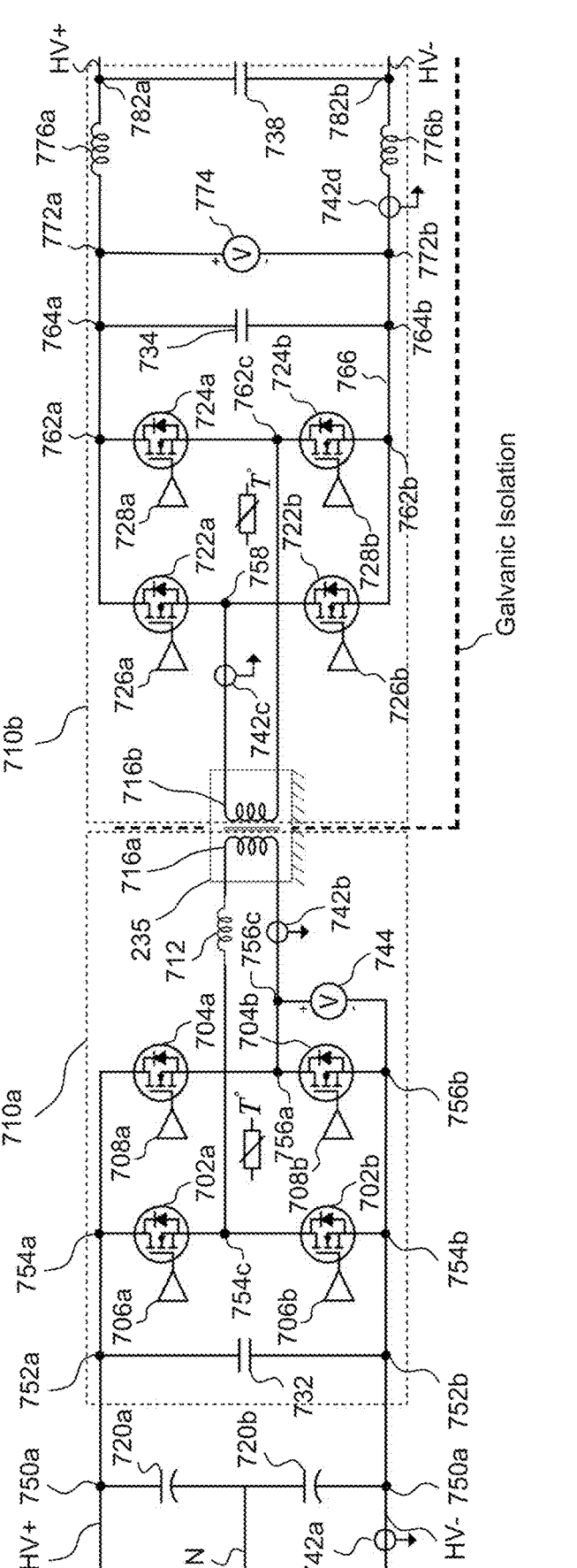
FIG. 7 schematically illustrates a dual-active-bridge (DAB) DC-to-DC converter, which may comprise a first DC to high-frequency AC converter, an isolation transformer, and a second high-frequency AC to DC converter.

As further schematically illustrated in FIG. 7, DC-link and bus capacitors 250 may further be connected to an EV isolated DC-to-DC converter 125, which may be provided by bidirectional dual-active-bridge (DAB) DC-to-DC power converter, offering galvanic isolation provided by a high-frequency transformer 714. DC-to-DC power converter 125 may comprise a primary side 710*a* having a first DC to high-frequency AC converter 230 connected to a primary winding 716*a* of isolation transformer 235, i.e., high-voltage side, allowing for converting DC to high-frequency AC, and a secondary side 710*b* having a second high-frequency AC to DC converter connected to a secondary winding 716*b* of isolation transformer 235, i.e., low-voltage side, allowing for converting high-frequency AC to DC. It may be appreciated that a first DC to high-frequency AC converter 230 may be connected to DC-link and bus capacitors 250 on a DC side, i.e., through terminals 752*a* and 752*b*, respectively. A current sensor 742*a* may be placed on the negative high-voltage line HV− for effective monitoring of the total current on the primary side 710*a* by providing more stable and low-noise point to measure the current, therefore, leading to cleaner data for control algorithms and allowing for precise feedback control, ensuring that the controller operates within safe limits. It may be appreciated that a pair of series-connected capacitors 720*a* and 720*b*, which may be connected between terminals 750*a* and 750*b*, may constitute a part of DC link and bus capacitors 250.

As illustrated in FIG. 7, primary side 710a of DC-to-DC power converter 125 may further comprise a capacitor 732, which may be provided by a flying capacitor and may be connected in parallel to DC link and bus capacitors 720a and 720b between the positive high-voltage line HV+ and the negative high-voltage line HV−, i.e., between terminals 752a and 752b; a pair of series-connected switches 702a and 702b, and a pair of series-connected switches 704a and 704b, wherein each pair of switches may be connected in parallel between HV+ and HV−, i.e., between terminals 754a and 754b; a primary inductor 716a of the high-frequency isolation transformer 714, which may be connected between terminals 754c and 756a; a leakage inductor 712, which may be connected in series with primary inductor 716a of high-frequency isolation transformer 714 between terminals 754c and 756a. It may be appreciated by a person skilled in the art that leakage inductor 712 may constitute a part of isolation transformer 714. Moreover, a voltmeter 744 may be connected between terminals 756b and 756c. It may be appreciated that switches 702a and 704b, and switches 702b and 704a may be complementary.

The secondary side 710b of DC-to-DC power converter 125 may comprise a pair of series-connected switches 722a and 722b, and a pair of series-connected switches 724a and 724b, wherein each pair of switches may be connected in parallel between HV+ and HV−, i.e., between terminals 762a and 762b. Secondary side 710b may further comprise a secondary inductor 716b constituting a part of the high-frequency isolation transformer 235, which may be connected between terminals 758 and 762c. It may be appreciated that switches 722a and 724b, and switches 722b and 724a may be complementary. Furthermore, it may be appreciated that first DC to high-frequency AC converter 230, when working in inverter mode, may provide AC current having a frequency from about 90 KHz to about 150 KHz.

It may also be appreciated that the above-mentioned switches of DC-to-DC converter 125 may be provided, for example, by silicon carbide (SiC) switches or any other suitable switches. As illustrated example, IGBT switches are shown in FIG. 7. It may be appreciated that switches 702a, 702b, 704a and 704b of the primary side 710a may comprise gate inputs 706a, 706b, 708a and 708b, respectively. Furthermore, switches 722a, 722b, 724a, and 724b may comprise gate inputs 726a, 726b, 728a, and 728b, respectively.

Furthermore, secondary side 710b of DC-to-DC power converter 125 may comprise a capacitor 734 connected in parallel to switches 722a, 722b, 724a, and 724b between the positive high-voltage line HV+ and negative high-voltage line HV−, i.e., between terminals 764a and 764b. Moreover, a voltmeter 774 may be connected between the positive high-voltage line HV+ and negative high-voltage line HV−, i.e., between terminals 772a and 772b. An inductor 776a may be placed in series with the positive high-voltage line HV+, i.e., between terminals 772a and 782a, and an inductor 776b may be placed in series with the negative high-voltage line HV−, i.e., 772b and 782b. Also, a capacitor 738 may be connected between HV+ and HV−, i.e., between terminals 782a and 782b.

Furthermore, the current sensors 742b and 742c, which may be provided by galvanically isolated Hall-effect sensors or any other suitable sensors, may be placed in series with inductors 716a and 716b, respectively, for measuring the current of isolation transformer 235 on the primary side 710a and secondary side 710b, respectively. Sensors 742b and 742c may provide an overcurrent protection for each pair of switches of DC-to-DC converter 125 by providing real-time current feedback to the power conversion controller 150, which is critical for implementing advanced modulation schemes, e.g., phase-shift control, as well as maintaining a power flow between primary side 710a and secondary side 710b. The accurate current feedback may allow DC-to-DC converter 125 to adjust the duty cycles and switching phases for optimal power transfer and efficiency. Also, a current sensor 742d may be placed in series with inductor 776b in order to detect any spikes in current.

Figure 8:
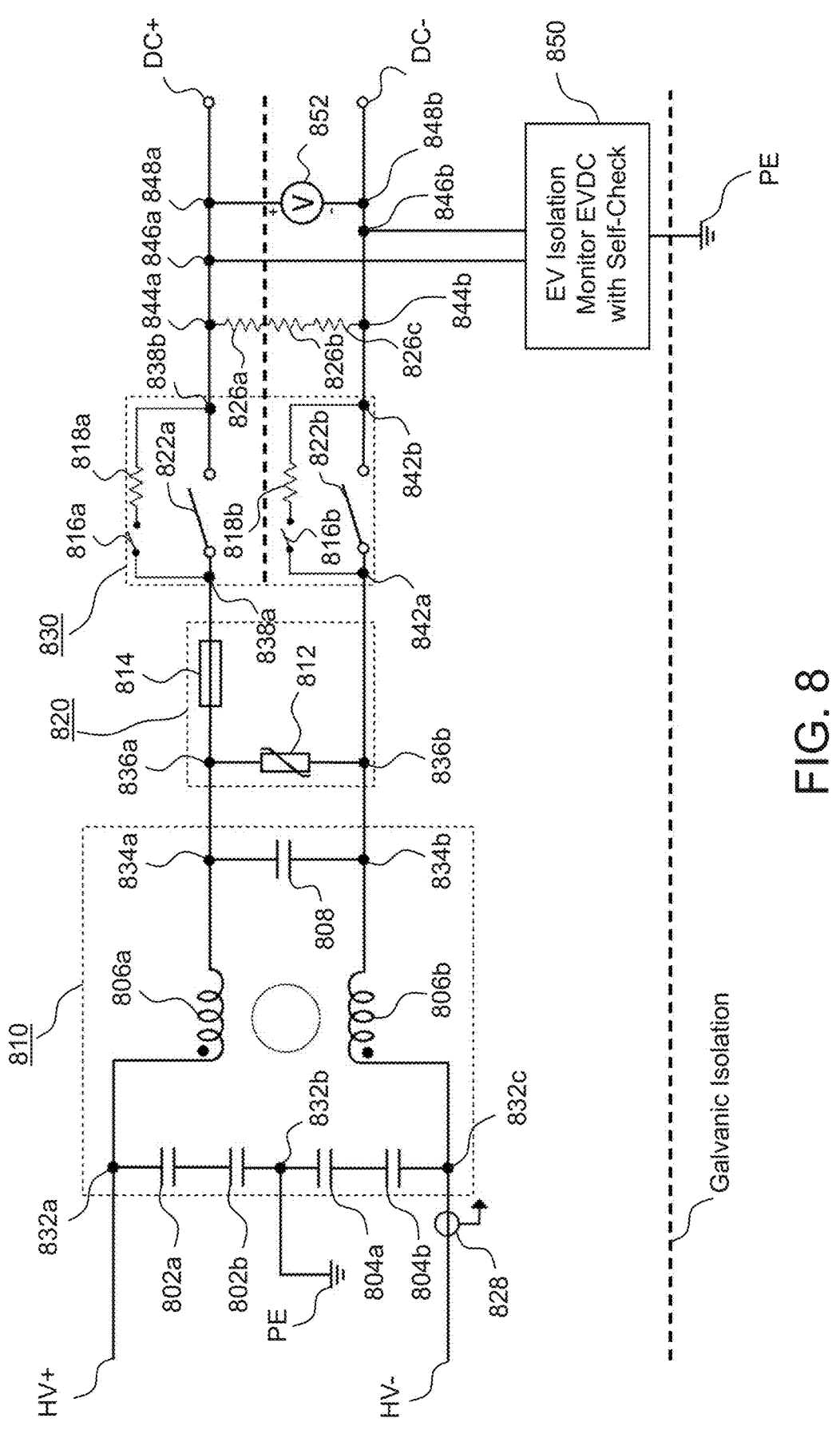
FIG. 8 schematically illustrates an EV DC circuit, which may comprise an electromagnetic interference (EMI) filter, a protection circuit and a pre-charge circuit, which may be directly connected to the battery of an EV at EV battery terminals.

Furthermore, DC-to-DC power converter 125 may be connected to an EV DC EMC, protection and pre-charge circuit 275 schematically illustrated in FIG. 8, i.e., through terminals 832a and 832b. It may be appreciated, EV DC EMC, protection and pre-charge circuit 275 may comprise an EMI filter 810, a protection circuit 820, and a pre-charge circuit 830.

An EMI filter 810 may comprise capacitors 802a, 802b, which may be connected in series between positive high-voltage line HV+ and neutral wire N, i.e., between terminals 832a and 832b, wherein terminal 832b may further be connected to ground (PE). An EMI filter 810 may further comprise capacitors 804a, 804b, which may be connected in series between negative high-voltage line HV− and neutral wire N, i.e., between terminals 832b and 832c. Furthermore, EMI filter 810 may comprise an inductor 806a, which may be connected in series with capacitors 802a, 802b, i.e., between terminals 832a and 834a, and an inductor 806b, which may be connected in series with capacitors 804a, 804b, i.e., between terminals 832c and 834b. It may be appreciated that inductors 806a, 806b may be magnetically coupled and share the same magnetic core, which may be made of ferromagnetic material, such as, for example, iron or ferrite. It may be appreciated that magnetically coupled inductors 806a, 806b may serve a purpose of a common mode choke, allowing to handle the maximum current flow and have acceptable power dissipation during normal operation of the bidirectional power converter, and create high impedance to attenuate common mode currents flowing along the input conductors.

Also, an EMI filter 810 may further comprise a capacitor 808, which may be connected in series with inductors 806a, 806b and in parallel with capacitors 802a, 802b, and capacitors 804a, 804b between positive high-voltage line HV+ and negative high-voltage line HV−, i.e., between terminals 834a, 834b. It may be appreciated by the person skilled in the art that a capacitor 808, which may be placed across positive high-voltage line HV+ and negative high-voltage line HV−, may be used to shunt differential conducted voltage noise, so the latter does not propagate further.

As shown in FIG. 8, a protection circuit 820 of electrical circuit 800 may comprise MOV 812, which may be connected between positive high-voltage line HV+ and negative high-voltage line HV−, in parallel with capacitor 808, i.e., between terminals 836a, 836b. Furthermore, a protection circuit 820 may comprise a fuse 814, which may be placed in series with positive high-voltage line HV+, i.e., between terminals 836a and 838a.

As further illustrated in FIG. 8, a pre-charge circuit 830 of electrical circuit 800 on a positive high-voltage side HV+ may comprise a main positive contactor 822a, which may be placed in series with positive high-voltage line HV+, a pre-charge contactor 816a, which may be connected in parallel with main positive contactor 822a, and a pre-charge resistor 818a, which may be connected in series with pre-charge contactor 816a and connected in parallel with main positive contactor 822a.

Furthermore, a pre-charge circuit 830 on a negative high-voltage side may comprise a main negative contactor 822*b*, which may be placed in series with negative high-voltage line HV−, a pre-charge contactor 816*b*, which may be connected in parallel with main negative contactor 822*b*, and a pre-charge resistor 818*b*, which may be connected in series with pre-charge contactor 816*b* and connected in parallel with main negative contactor 822*b*.

A pre-charge circuit 830 may further be followed by resistors 826*a*, 826*b*, 826*c*, which may be connected in series between positive high-voltage line HV+ and negative high-voltage line HV−, i.e., between terminals 844*a* and 844*b*, to provide voltage discharge. An EV isolation monitor 850, for monitoring EV DC voltage, may further be connected to positive high-voltage line HV+ at terminal 846*a* and negative high-voltage line HV− at terminal 846*b*, as well as to PE, which may allow to monitor the entire circuit that leads to the battery of an EV. EV isolation monitors 850 may be used to measure the output DC voltage and voltage to PE, as well as to measure the resistance between HV+, HV− and PE, in order to detect a ground fault, protecting both an EV user and a power conversion circuit. Furthermore, a voltmeter 852 may be connected between terminals 848*a* and 848*b*, allowing to measure the voltage of the EV battery of a connected EV.

Figure 9:
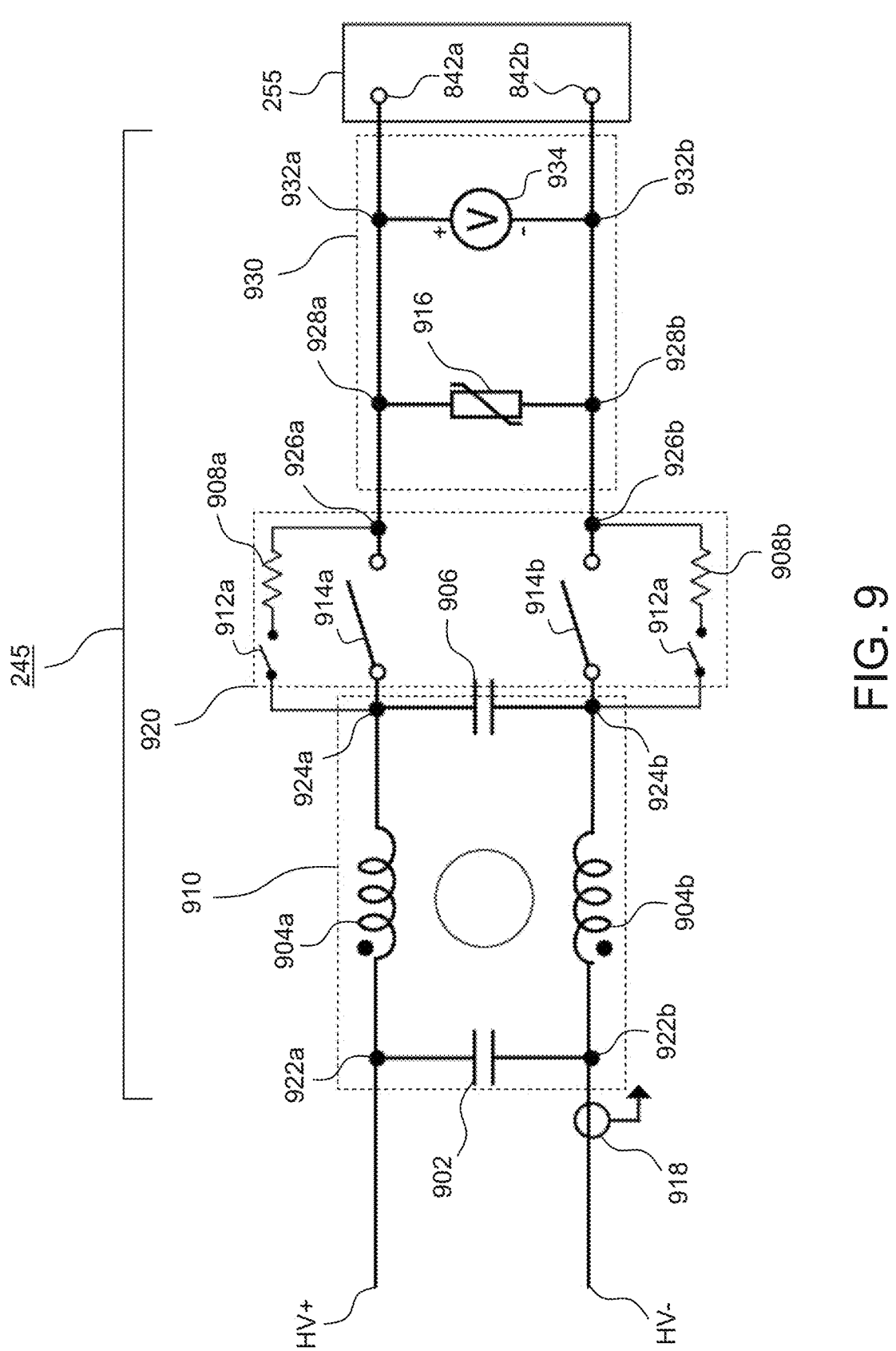
FIG. 9 schematically illustrates a photovoltaic (PV) electromagnetic compatibility (EMC) and protection circuit, which may comprise an electromagnetic interference (EMI) filter, a protection circuit and a pre-charge circuit, wherein an output of at least one PV panel may be provided to DC link and bus capacitors.

FIG. 9 schematically illustrates photovoltaic (PV) electromagnetic compatibility (EMC), protection and pre-charge circuit 245 comprising an EMI filter 910, a pre-charge circuit 920, and a protection circuit 930. The EMI filter 910 may comprise a capacitor 902, which may be connected across positive high-voltage line HV+ and negative high-voltage line HV−, i.e., between terminals 922*a*, 922*b*, respectively; an inductor 904*a*, which may be placed in series with positive high-voltage line HV+, i.e., between terminals 922*a* and 924*a*, and an inductor 904*b* may be placed in series with negative high-voltage line HV−, i.e., between terminals 922*b* and 924*b*; and a capacitor 906, which may be connected across positive high-voltage line HV+ and negative high-voltage line HV−, i.e., in parallel with capacitor 902 between terminals 924*a* and 924*b*. It may be appreciated that inductors 904*a*, 904*b* may be magnetically coupled and share the same magnetic core, which may be made of ferromagnetic material, such as, for example, iron or ferrite. It may be appreciated that magnetically coupled inductors 806*a*, 806*b* may serve a purpose of a common mode choke and create high impedance to attenuate common mode currents flowing along the conductors. It may be appreciated that a current sensor 918 may be placed on the negative high-voltage line HV− for measuring the total current on the output side of the PV circuit 900.

As further schematically illustrated in FIG. 9, a pre-charge circuit 920, on the positive high-voltage side HV+ may comprise a main positive contactor 914*a*, which may be placed in series with positive high-voltage line HV+, i.e., between terminals 924*a* and 926*a*, a pre-charge contactor 912*a*, which may be connected in parallel with main positive contactor 914*a*, and a pre-charge resistor 908*a*, which may be connected in series with pre-charge contactor 912*a* and connected in parallel with main positive contactor 914*a*. Furthermore, a pre-charge circuit 920, on the negative high-voltage side HV− may comprise a main negative contactor 914*b*, which may be placed in series with negative high-voltage line HV−, i.e., between terminals 924*b* and 926*b*, a pre-charge contactor 912*b*, which may be connected in parallel with main negative contactor 914*b*, and a pre-charge resistor 908*b*, which may be connected in series with pre-charge contactor 912*b* and connected in parallel with main negative contactor 914*b*.

As further illustrated in FIG. 9, a pre-charge circuit 920 may be connected to a protection circuit 930, which may comprise a MOV 916 connected across positive high-voltage line HV+ and negative high-voltage line HV−, i.e., between terminals 928*a* and 928*b*. Also, a voltmeter 924 may be connected between terminals 932*a* and 932*b*, in parallel with MOV 916, for measuring the total output voltage between positive and negative PV outputs 842*a* and 842*b* of PV panel array 255, respectively.

It may be appreciated by a person skilled in the art that PV panel array 255 may be controlled by power electronics and control systems designed to optimize energy generation and delivery, such, as for example PV DC optimizers 253 (see FIG. 2B). The amount of power produced by each PV panel of PV panel array 255 may vary depending on the internal and/or external conditions, e.g., environmental conditions, PV material, heat distribution, etc. Therefore, each PV panel or a group PV of panels, which exhibit similar behavior under certain conditions (for example, produce about the same amount of power on a sunny day), may be operated using a separate controller, which may comprise maximum power point tracking (MPPT) algorithms, which may allow to ensure that a PV panel operates at its optimal power point under varying environmental conditions (e.g., even under suboptimal conditions, such as partial shading, temperature changes, or non-ideal sunlight). For large PV panel arrays, certain systems dynamically reconfigure the series-parallel arrangements of panels to match environmental conditions and load requirements. More precisely, each controller may collect data from sensors (e.g., voltage, current, irradiance, and temperature sensors connected to a PV panel), which may allow to dynamically adjust operating parameters of each panel and achieve maximum efficiency.

It may further be appreciated by a person skilled in the art that each PV panel of PV panel array 255 may have a non-linear power-voltage characteristic curve, which is influenced by irradiance (sunlight intensity) and temperature. In this case, MPP is the point on the curve where the corresponding PV panel produces maximum power, wherein MPP varies dynamically depending on the environmental changes. Thus, PV panel controllers may continuously monitor the voltage and current output of each panel of PV panel array to find its MPP. It is known by a person skilled in the art that algorithms like Perturb and Observe (P&O), Incremental Conductance, Hill Climbing, etc., may be used to adjust the panel's operating voltage to achieve MPP. MPPT may adjust load impedance dynamically, ensuring that the operating point matches MPP, which may maximize the energy extracted, especially under changing conditions like irradiance reduced by cloud cover and temperature fluctuation affecting panel efficiency.

Coming back to FIG. 9, in this embodiment, while the power produced by PV panel array 255 may be controlled using an MPPT algorithm to maximize the energy extracted from the PV panels, the PV panel array 255 may further be connected directly to DC link and bus capacitors 250. More specifically, the power generated by a PV panel array may be supplied to DC link and bus capacitors without first passing through a DC-to-DC converter. In this case, the voltage of DC link and bus capacitors 250 may be adjusted by controller 150 to be lower than the output voltage of PV panel array 255, allowing to create the voltage difference, which is fundamental for power flow in an electrical circuit and, therefore, allows for the power flow from the PV panel array to DC link and bus capacitors. It may be appreciated that DC link and bus capacitors 250 may accept as much power as is available from the PV panels, and use such power for supplying AC power, charging the EV or the storage battery. If more power is required to, for example, charge the battery of an EV, then DC link and bus capacitors 250 may draw additional power, for example, from the split-phase mains or from an external battery 270 (see, for instance, FIG. 11).

It may be further appreciated by a person skilled in the art that power conversion controller 150 may receive from PV DC power optimizers 253 an available DC voltage value and DC current value to further estimate an available DC power, which may be provided by PV panel array 255. This data may then be used to dynamically adjust voltage-power droop curve and frequency-power droop curve, which may allow for further adjustment of the power transfer from PV panel array 255 based on demand of DC link and bus capacitors 250, while ensuring stability of the microgrid.

In an alternative embodiment, it may be appreciated that a DC-to-DC power converter (not shown in the drawings) may be connected between DC link and bus capacitors 255 and PV panel array 250, allowing to boost DC produced by PV panels.

Figure 10:
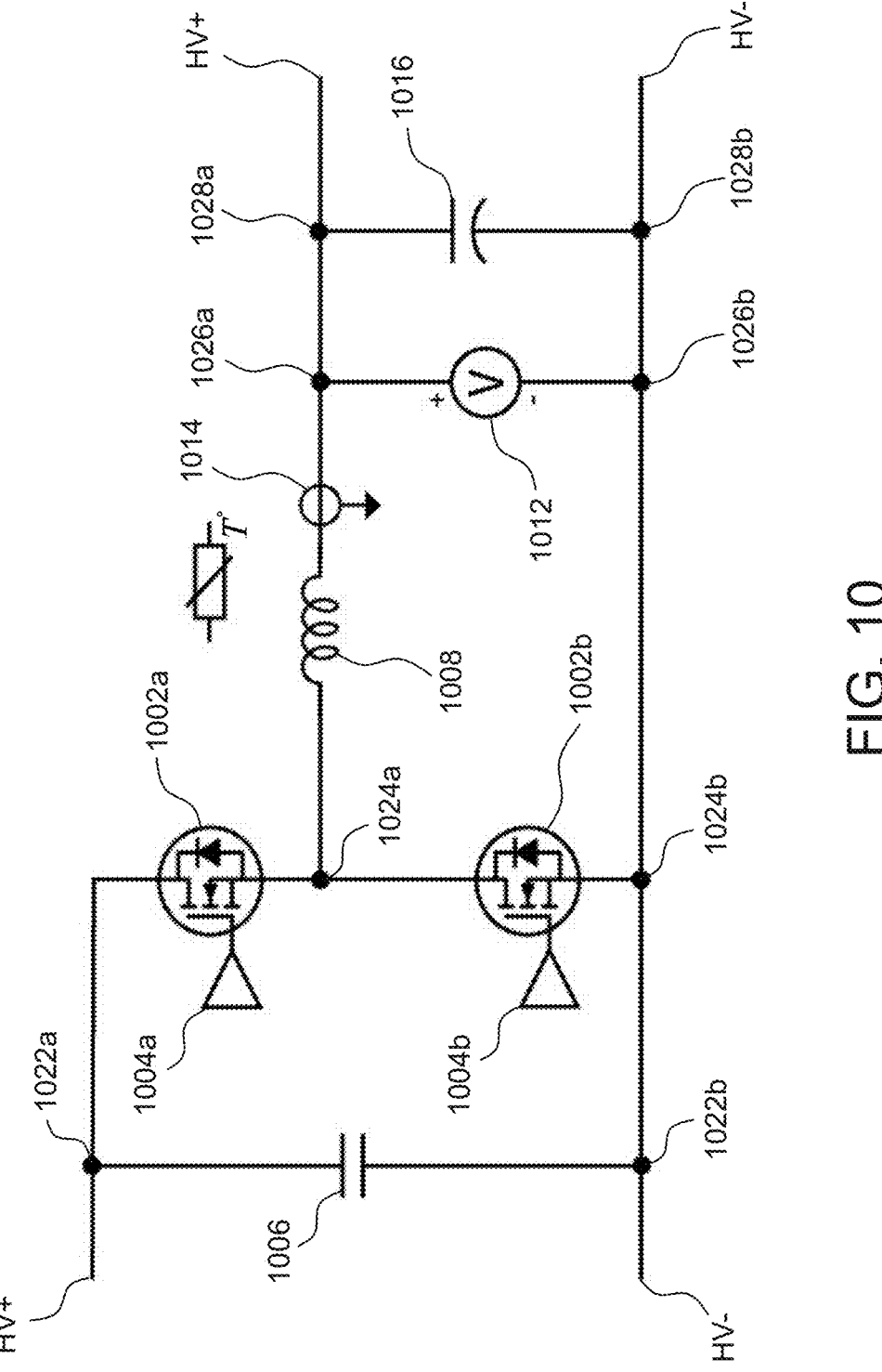
FIG. 10 schematically illustrates a third energy storage system (ESS) DC-to-DC converter of battery energy storage system (BESS) of an external storage battery.

FIG. 10 schematically illustrates a third ESS DC-to-DC converter 260 of the BESS. The third ESS DC-to-DC converter 260 may comprise a capacitor 1006, which may be connected across positive high-voltage line HV+ and negative high-voltage line HV−, i.e., between terminals 1022a and 1022b; a pair of switches 1002a and 1002b, wherein a switch 1002a may be placed in series with positive high-voltage line HV+, i.e., between terminals 1022a and 1024a, and a switch 1002b may be placed in series with negative high-voltage line HV−, i.e., between terminals 1022b and 1024a; an inductor 1008, which may be placed in series with positive high-voltage line HV+, i.e., between terminals 1024a and 1026a; a voltmeter 1012, which may be connected across positive high-voltage line HV+ and negative high-voltage line HV−, i.e., between terminals 1026a and 1026b; and a capacitor 1016, which may be connected in parallel with switches 1002a and 1002b, i.e., between terminals 1028a and 1028b.

Figure 11:
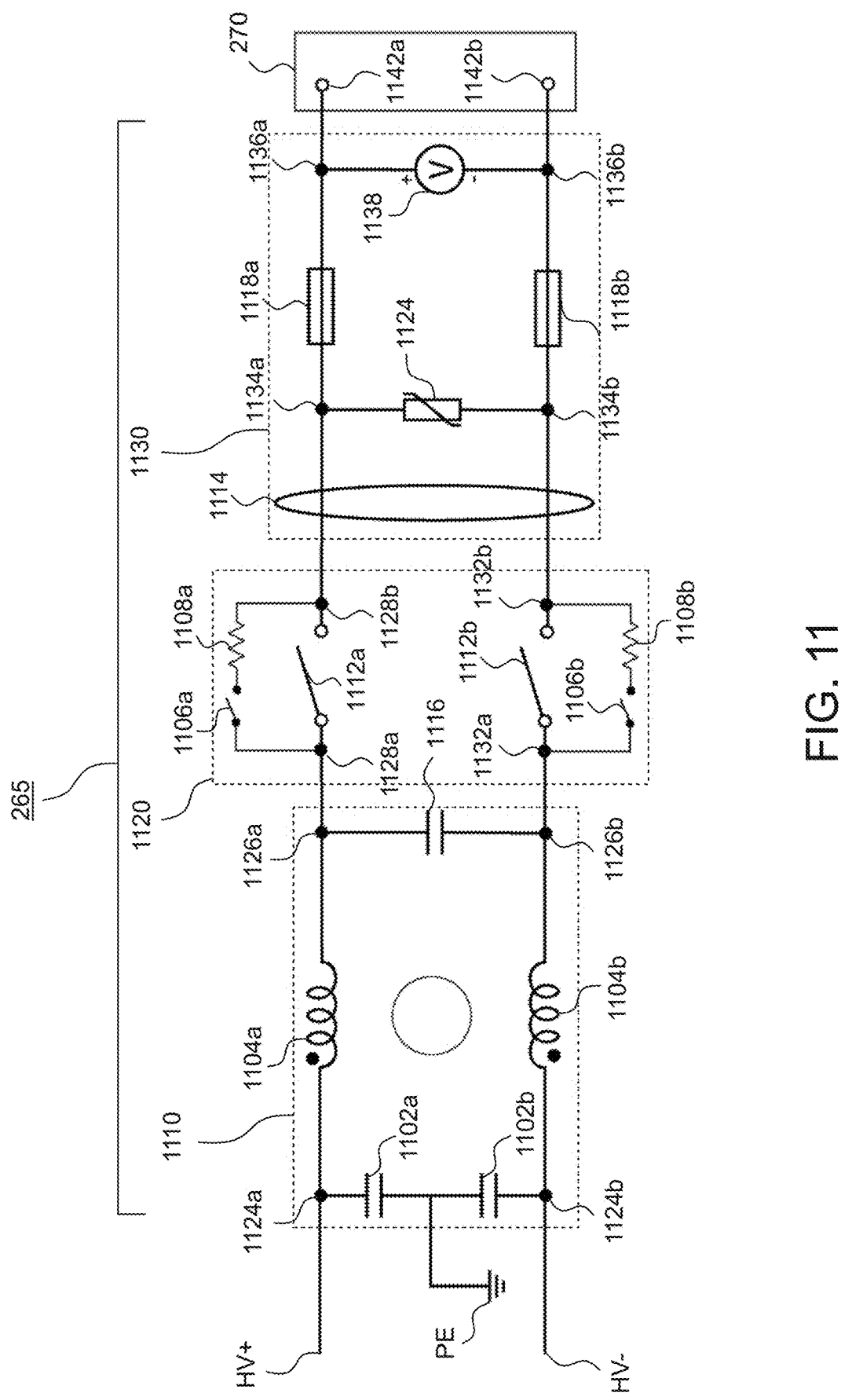
FIG. 11 schematically illustrates a BESS EMC, protection and pre-charge circuit, which may comprise an electromagnetic interference (EMI) filter, a pre-charge circuit and a protection circuit, which may be connected to the terminals of an external storage battery.

The third ESS DC-to-DC converter 260 of the BESS may further be connected to BESS EMC, protection and pre-charge circuit 265, which is schematically illustrated in FIG. 11. BESS EMC, protection and pre-charge circuit 265 may comprise EMI filter 1110, a pre-charge circuit 1120, and a protection circuit 1130. The EMI filter 1110 may comprise a capacitor 1102a, which may be connected between positive high-voltage line HV+ and the ground (PE), and also a capacitor 1102b, which may be connected between negative high-voltage line HV− and the ground (PE). An inductor 1104a may be connected in series with capacitor 1102a, i.e., between terminals 1124a and 1126a, and an inductor 1104b may be connected in series with capacitor 1102b, i.e., between terminals 1124b and 1126b. Furthermore, a capacitor 1116 may be connected between terminals 1126a, 1126b, in parallel with capacitors 1102a, 1102b. It may be appreciated that inductors 1004a and 1004b may be magnetically coupled, i.e., wound on the same magnetic core, which may be made of ferromagnetic material, such as, for example, iron or ferrite, forming a common mode choke.

As further illustrated in FIG. 11, the pre-charge circuit 1120 on the positive high-voltage side HV+ may comprise a main positive contactor 1112a, which may be placed in series with positive high-voltage line HV+, i.e., between terminals 1128a and 1128b, a pre-charge contactor 1106a, which may be connected in parallel with main positive contactor 1112a, and a pre-charge resistor 1108a, which may be connected in series with pre-charge contactor 1106a and connected in parallel with main positive contactor 1112a.

Furthermore, the pre-charge circuit 1120 on the negative high-voltage side HV− may comprise a main negative contactor 1112b, which may be placed in series with negative high-voltage line HV−, i.e., between terminals 1132a and 1132b, a pre-charge contactor 1106b, which may be connected in parallel with main negative contactor 1112b, and a pre-charge resistor 1108b, which may be connected in series with pre-charge contactor 1106b and connected in parallel with main negative contactor 1112b.

A protection circuit 1130 may comprise a ground fault circuit interrupter (GFCI) 1114 may be connected to the pre-charge circuit 1120. A MOV 1124 may be placed across positive high-voltage line HV+ and negative high-voltage line HV−, i.e., between terminals 1134a and 1134b. Furthermore, a fuse 1118a may be placed in series with positive high-voltage line HV+ and MOV 1124, i.e., between terminals 1134a and 1136a, and a fuse 1118b may be placed in series with negative high-voltage line HV− and MOV 1124, i.e., between terminals 1134b and 1136b. Moreover, a voltmeter 1138 may be connected EV power terminals, i.e., to positive DC terminal 1142a and the negative DC terminal 1142b of EV battery 270, for measuring the total output voltage of the EV battery.

What is claimed is:

1. A bidirectional power converter for converting electric power between an AC power grid and an electric vehicle (EV), the system comprising:

two AC-to-DC power converters, each one of said two AC-to-DC power converters having a first AC port connectable to a respective phase of said AC power grid and a second AC port connected together at a midpoint or neutral;

at least one isolated DC-to-DC power converter connected to a DC side of said two AC-to-DC power converters and to EV power terminals; and a power conversion controller having an interface for receiving a charge voltage command from a battery management system (BMS) of an electric power storage battery of an EV, a grid tie phase and a voltage measurement, said power conversion controller operatively connected to said two AC-to-DC power converters and to said at least one isolated DC-to-DC power converter for transferring power in accordance with said charge voltage command and said grid tie phase and voltage measurement, wherein said at least one isolated DC-to-DC power converter comprises:

an isolation transformer;

a first DC to high-frequency AC converter connected to said DC side of said two AC-to-DC power converters and to a primary winding of said isolation transformer on an AC side; and a second high-frequency AC to DC converter connected to a secondary winding of said isolation transformer on said AC side and to said EV power terminals on said DC side.

2. The power converter as defined in claim 1, wherein said each one of said two AC-to-DC power converters is further connected on said DC side to a positive high-voltage DC terminal, a negative high-voltage DC terminal, and said neutral.

3. The power converter as defined in claim 1, wherein said positive high-voltage DC terminal, said negative high-voltage DC terminal, and said neutral terminal are further connected to DC link and bus capacitors.

4. The power converter as defined in claim 3, wherein said DC link and bus capacitors are connected to a DC output of a photovoltaic (PV) system, said PV system is provided by a PV panel array, wherein said PV panel array comprises PV DC optimizers.

5. The power converter as defined in claim 4, wherein said interface of said power conversion controller further communicates with said PV DC power optimizers of said PV panel array to receive an available PV DC voltage value and a PV DC current value allowing to obtain available PV DC power value and dynamically adjust a voltage-power droop curve and a frequency-power droop curve corresponding to said PV panel array based on said DC voltage value and said DC current value.

6. The power converter as defined in claim 5, wherein said conversion controller dynamically adjusts a voltage level of said DC link and bus capacitors based on said voltage-power droop curve and frequency-power droop curve to create a voltage difference between said voltage level of said DC link and bus capacitors and said available PV DC voltage value, wherein said voltage difference is provided by said voltage level being lower than said available PV DC voltage value.

7. The power converter as defined in claim 6, wherein said power conversion controller is further responsive to said available voltage value to transfer power from said DC output of said PV panel array to said DC link and bus capacitors in accordance with said voltage difference.

8. The power converter as defined in claim 4, wherein said DC output of said PV panel passes through an electromagnetic compatibility (EMC), protection and pre-charge circuit before being provided to said DC link and bus capacitors.

9. The power converter as defined in claim 3, wherein said first DC to high-frequency AC converter is further connected on said DC side to said DC link and bus capacitors.

10. The power converter as defined in claim 1, wherein said first DC to high-frequency AC converter working in inverter mode provides AC current having a frequency from about 90 KHz to about 150 KHz.

11. The power converter as defined in claim 1, wherein switches of said first DC to high-frequency AC converter and said switches of said second high-frequency AC to DC converter are provided by silicon carbide (SiC) switches.

12. The power converter as defined in claim 1, wherein said interface of said power conversion controller communicates said each one of said two AC-to-DC power converter working in rectifier mode to provide said AC current to a desired grid tie phase.

13. The power converter as defined in claim 1, wherein said at least one isolated DC-to-DC power converter further comprises a third DC-to-DC power converter associated with an energy storage system (ESS), said third DC-to-DC power converter is connected to an ESS EMC, protection and pre-charge circuit of a battery energy storage system (BESS) of an external storage battery.

14. The power converter as defined in claim 13, wherein said third DC-to-DC power converter is further connected to said DC link and bus capacitors.

15. The power converter as defined in claim 1, wherein said interface of said power conversion controller further communicates with said BMS and receives said charge voltage command including a desired charge voltage value of said EV, and said power conversion controller is further responsive to said charge voltage command to convert power from said AC port to a DC power at said desired charge voltage value of said electric power storage battery of said EV.

16. The power converter as defined in claim 1, wherein said second high-frequency AC to DC converter is further connected to an EV EMC, protection and pre-charge circuit on said DC side.

17. The converter as defined in claim 1, wherein each one of said two AC-to-DC power converters is a three-level T-type AC-to-DC power converter.

18. The converter as defined in claim 1, wherein at least one isolated DC-to-DC power converter is a three-level dual active bridge DC-to-DC power converter.

\* \* \* \* \*